3,016,363
POLY-α-OLEFIN COMPOSITIONS CONTAINING DIALKYL-3,3'-THIODIPROPIONATES AND ALKYLATED HYDROQUINONE MONOGLYCIDYL ETHERS
Clarence E. Tholstrup and Alan Bell, Kingsport, Tenn., assignors to Eastman Kodak Company, Rochester, N.Y., a corporation of New Jersey
No Drawing. Filed Feb. 15, 1960, Ser. No. 8,538
11 Claims. (Cl. 260—45.8)

This invention relates to new poly-α-olefin compositions. Preferred embodiments of the invention relate to polyethylene and polypropylene compositions having improved stability at elevated temperatures to oxidative degradation.

Poly-α-olefins such as polyethylene, polypropylene and the like are commonly subjected to elevated temperatures in the course of their processing into useful items of commerce. Such processing methods as rolling, injection molding, extrusion and the like at elevated temperatures usually result in oxidative degradation of the polymer. In addition, many uses of poly-α-olefins, such as electrical insulation and the like, often times expose the poly-α-olefin to elevated temperatures. To minimize oxidative deterioration in poly-α-olefins, anti-oxidants or stabilizers are often times incorporated therein.

It is an object of this invention to provide new poly-α-olefin compositions having improved resistance to thermal degradation.

It is another object of this invention to provide new synergistic combinations of stabilizers for poly-α-olefin compositions.

It is also an object of this invention to provide novel polyethylene and polypropylene compositions containing synergistic combinations of compounds that improve the stability of the polyethylene and polypropylene compositions against deterioration resulting from exposure to elevated temperatures.

Other objects of the invention will be apparent from the description and claims that follow.

The present invention comprises poly-α-olefin compositions having incorporated therein a stabilizer combination of a diester of 3,3'-thiodipropionic acid and an alkylated hydroquinone monoglycidyl ether.

The diesters of 3,3'-thiodipropionic acid comprising the present stabilizer combinations have the following formula

wherein R is an alkyl radical having at least 4 and generally 4 to 20 carbon atoms, with 8 to 18 carbon atoms being preferred. A particularly effective ester has twelve carbon atoms for the R substituent, namely, dilauryl 3,3'-thiodipropionate. However, any diester of 3,3'-thiodipropionic acid as described above can be employed in the present stabilizer combination including the butyl, amyl, hexyl, heptyl, octyl, nonyl, decyl, tridecyl, myristyl, pentadecyl, cetyl, heptadecyl, stearyl, and eicosyl diesters of 3,3'-thiodipropionic acid, or mixtures thereof.

A wide variety of alkylated hydroquinone monoglycidyl ethers can be effectively utilized in combination with the described diesters of 3,3'-thiodipropionic acid including those disclosed in Bell U.S. Patent No. 2,750,119, dated August 7, 1956 and having the following general formula,

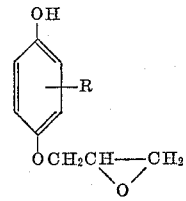

wherein R is a tertiary alkyl radical having 4 to 8 carbon atoms. Typical of such alkylated hydroquinone monoglycidyl ethers are:

2-tert.-butyl-4-(2,3-epoxypropoxy)phenol,
3-tert.-butyl-4-(2,3-epoxypropoxy)phenol,
2-tert.-amyl-4-(2,3-epoxypropoxy)phenol,
3-tert.-amyl-4-(2,3-epoxypropoxy)phenol,
2-tert.-hexyl-4-(2,3-epoxypropoxy)phenol,
3-tert.-hexyl-4-(2,3-epoxypropoxy)phenol,
2-tert.-octyl-4-(2,3-epoxypropoxy)phenol,
3-tert.-octyl-4-(2,3-epoxypropoxy)phenol, and the like.

The combination of the described diesters of 3,3'-thiodipropionic acid and alkylated hydroquinone monoglycidyl ethers can be used to stabilize a wide variety of solid poly-α-olefin compositions against deterioration resulting from exposure to elevated temperatures. Any of the normally solid polymers of α-monoolefinic aliphatic hydrocarbons containing 2 to 10 carbon atoms can be stabilized in accordance with the invention. The subject stabilizer combinations are preferably used in polyethylene and polypropylene, particularly polypropylene, although such poly-α-olefins as poly(3-methylbutene-1), poly(4-methylpentene-1), poly(pentene-1), poly(3,3-dimethylbutene-1), poly(4,4-dimethylbutene-1), poly(octene-1), poly(decene-1) and the like can also be stabilized with the subject stabilizer combinations. Both the so-called "low density" and "high density" or high crystallinity poly-α-olefin compositions can be stabilized in accordance with the invention. Reference is made to Fawcett et al. U.S. Patent No. 2,153,553, granted April 11, 1939, and to copending applications Coover U.S. Serial No. 559,536, filed January 17, 1956, now abandoned, and Coover et al. U.S. Serial No. 724,904, filed March 31, 1958, with regard to the preparation of various poly-α-olefin compositions that can be stabilized against thermal degradation in accordance with the invention. The additive stabilizer combinations of the invention are especially useful for stabilizing the solid resinous poly-α-olefins having average molecular weights of at least 15,000 and more usually at least 20,000, although the stabilizer combinations of the invention can also be utilized to stabilize the so-called poly-α-olefin waxes having lower average molecular weights of usually 3,000 to 12,000.

The amount of the combination of the diester of 3,3'-thiodipropionic acid and the alkylated hydroquinone monoglycidyl ethers employed in poly-α-olefin compositions in accordance with the invention can be widely varied, the stabilizing amount of this combination usually varying with the particular use to which the poly-α-olefin compositions are to be put. Concentrations of about .001% to 5% for each component of the stabilizer combination are generally used, with about .01% to 3% of the diester of 3,3'-thiodipropionic acid and about .01% to 1% of the alkylated hydroquinone monoglycidyl ether being preferred, the concentration being based on the weight of the poly-α-olefin. We generally utilize the combination of the subject stabilizers at a weight ratio of the diester of 3,3'-thiodipropionic acid to the alkylated hydroquinone monoglycidyl ether in the range of 1/100 to 100/1, and preferably 1/50 to 50/1.

The stabilizer combination of the invention can be incorporated or blended into poly-α-olefin compositions by the conventional methods utilized for blending such materials into resins or plastics. Typical of such methods that can be suitably employed include milling on heated rolls, deposition from solvents, and dry blending. The stabilizers of the invention can be incorporated separately or together into the poly-α-olefin compositions.

The stabilizer combinations of the present invention lend to poly-α-olefin compositions improved stability, and more particularly, improved stability against oxidative deterioration resulting from exposure to elevated temperatures. In addition, poly-α-olefin compositions containing the stabilizer combinations of the invention have enhanced stability against deterioration resulting from exposure to sunlight or ultraviolet light. Thus, poly-α-olefins stabilized in accordance with the invention have an extended life expectancy and can be used more effectively than unstabilized poly-α-olefins for a wide diversity of uses. Poly-α-olefins stabilized as described can be cast, extruded, rolled or molded into sheets, rods, tubes, pipes, filaments, textile fibers, and other shaped articles, including the widely used films of the polymers about .5 to 100 mils in thickness. The present compositions can be used for coating paper, wire, metal foil, glass fiber fabrics, synthetic and natural textiles or fabrics, and other such materials.

The subject stabilizer combinations of dialkyl esters of 3,3'-thiodipropionic acid and alkylated hydroquinone monoglycidyl ethers are synergistic combinations, namely, the stabilizing effect of such combinations in poly-α-olefins is substantially greater than the additive effect of the individual stabilizers of the combination.

The invention is illustrated by the following examples of preferred embodiments thereof. In the following examples the stability of the poly-α-olefins was determined by an oven storage test. The poly-α-olefin under investigation is compression molded into a smooth sheet or plate. The plate is then cut into pieces weighing about 0.25 g. each. The 0.25 g. samples of the molded polymer are then placed in an air oven at 160° C. Samples are removed at intervals and each sample analyzed for peroxides. The oven storage life is the time required for initial peroxide formation in a sample of the polymer. To determine peroxide formation in the oven exposed samples, each 0.25 g. sample in question is dissolved or suspended in 20 ml. of carbon tetrachloride and allowed to digest for 25 minutes. To this is added 20 ml. of a mixture consisting of 60% glacial acetic acid and 40% chloroform, and then 1.0 ml. of a saturated aqueous solution of potassium iodide. The resulting mixture is allowed to react for two minutes, 100 ml. of water is added to dilute the mixture, and then a starch indicator is added. The resulting mixture is then back-titrated with 0.002N sodium thiosulfate. The peroxide concentration, P, in milliequivalents per kilogram of polymer is given by the expression, $P = 8S$, where $S$ is the number of milliliters of 0.002N sodium thiosulfate used.

EXAMPLE 1

Several samples of powdered polypropylene were mixed with diesters of 3,3'-thiodipropionic acid an an alkylated hydroquinone monoglycidyl ether of the invention, compression molded into plate 1/16 inch in thickness, and the resulting molded samples evaluated with respect to stability by the 160° C. oven storage test described above. The polypropylene was a plastic grade solid polypropylene having an average molecular weight greater than 15,000, a density of about .91 and an inherent viscosity of about 1.74 as determined in tetralin at 145° C. The results of the stability test are summarized by the data set out in Table A below. Samples of the individual components of the stabilizer combinations in the polypropylene, as well as the polypropylene with no additive, were included in the stability test for purposes of comparison. In Table A "DLTDP" indicates dilauryl-3,3'-thiodipropionate, "DSTDP" indicates distearyl-3,3'-thiodipropionate and "DBTDP" indicates di-n-butyl-3,3'-thiodipropionate. The concentrations in Table A are based on the weight of the polypropylene.

*Table A*

| Additive | Oven life at 160° C., Hours |
|---|---|
| None | 0.2 |
| 0.1% DBTDP | 1 |
| 0.1% DSTDP | 1 |
| 0.1% DLTDP | 1 |
| 0.3 DLTDP | 2 |
| 0.1% 2-Tert.-butyl-4-(2, 3-epoxypropoxy) phenol | 4 |
| 0.5% 2-Tert -butyl-4-(2, 3 epoxypropoxy) phenol | 10 |
| 0.1% DBTDP+0.1% 2-Tert.-butyl-4-(2,3-epoxypropoxy) phenol | 50 |
| 0.1% DLTDP+0.05% 2-Tert.-butyl-4-(2,3-epoxypropoxy) phenol | 60 |
| 0.3% DLTDP+0.05% 2-Tert.-butyl-4-(2,3-epoxypropoxy) phenol | 100 |
| 0.05% DLTDP+0.2% 2-Tert.-butyl-4-(2,3-epoxypropoxy) phenol | 140 |
| 0.1% DLTDP+0.1% 2-Tert.-butyl-4-(2,3-epoxypropoxy) phenol | 150 |
| 0.1% DSTDP+0.1% 2-Tert.-butyl-4-(2,3-epoxypropoxy) phenol | 160 |
| 0.2% DLTDP+0.1% 2-Tert.-butyl-4-(2,3-epoxypropoxy) phenol | 200 |
| 0.1% DLTDP+0.2% 2-Tert.-butyl-4-(2,3-epoxypropoxy) phenol | 320 |

As can be observed from the data set out in the above table, the subject stabilizer combinations of diesters of 3,3'-thiodipropionic acid and alkylated hydroquinone monoglycidyl ethers give stabilizing effects in polypropylene that are substantially greater than the additive effects of the individual components comprising such combinations. Similar synergism is demonstrated if plastic grade solid polyethylene having an average molecular weight greater than 15,000, a density of about .91 and a melt index of about 7.59 is substituted for the polypropylene as the poly-α-olefin or if 3-tertiary-butyl-4-(2,3-epoxypropoxy)phenol is substituted for the 2-tertiary-butyl-4-(2,3-epoxypropoxy) phenol, in the described stability evaluations.

EXAMPLE 2

Several stabilizer combinations of the invention were evaluated by the method described in Example 1 in plastic grade solid polypropylene having an average molecular weight greater than 15,000, a density of about .91 and an inherent viscosity of about 1.84 as determined in tetralin at 145° C. The results of the stability test are summarized by the data set out in Table B below. In Table B, "DLTDP" indicates dilauryl-3,3'-thiodripropionate. The concentrations in Table B are based on the weight of the polypropylene.

*Table B*

| Additive | Oven life at 160° C., Hours |
|---|---|
| None | 0.2 |
| 0.1% DLTDP | 1 |
| 0.1% 2-Tert.-butyl-4-(2,3-epoxypropoxy) phenol | 4 |
| 0.1% 2-Tert.-octyl-4-(2,3-epoxypropoxy) phenol | 6 |
| 0.1% DLTDP+0.1% 2-Tert.-octyl-4-(2,3,epoxypropoxy) phenol | >100 |
| 0.1% DLTDP+0.1% 2-Tert.-butyl-4-(2,3-epoxypropoxy) phenol | >120 |

The tertiary octyl radical in the 2-tertiary-octyl-4-(2,3-epoxypropoxy)phenol was a 1,1,3,3-tetramethylbutyl radical. The data set out in Table B further illustrates the synergism that exists between the components of the stabilizer combinations of the invention.

The present invention thus provides novel poly-α-olefin compositions having improved stability against deterioration resulting from exposure to elevated temperatures, and particularly, it provides novel synergistic stabilizer combinations for poly-α-olefin compositions.

Although the invention has been described in detail with reference to preferred embodiments thereof, it will be understood that variations and modifications can be effected within the spirit and scope of the invention as described hereinabove and as defined by the appended claims.

We claim:

1. A solid poly-α-olefin composition comprising a solid poly-α-olefin prepared from an α-monoolefinic aliphatic hydrocarbon having 2 to 10 carbon atoms containing a stabilizer combination comprising about .001% to 5% by weight based on said poly-α-olefin of a stabilizer combination comprising a diester of 3,3'-thiodipropionic acid having the formula

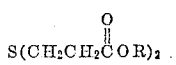

wherein R is an alkyl radical having 4 to 18 carbon atoms, and about .001% to 5% by weight based on said poly-α-olefin of an alkylated hydroquinone monoglycidyl ether having a formula selected from the group consisting of

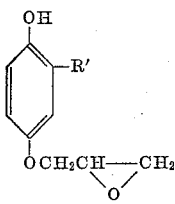

and

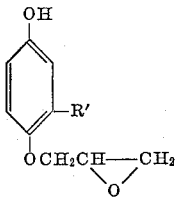

wherein R' is a tertiary alkyl radical having 4 to 8 carbon atoms.

2. A solid poly-α-olefin composition comprising a solid poly-α-olefin selected from the group consisting of polyethylene and polypropylene containing a stabilizer combination comprising about .001% to 5% by weight based on said poly-α-olefin of a stabilizer combination comprising a diester of 3,3'-thiodipropionic acid having the formula

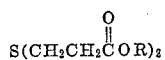

wherein R is an alkyl radical having 4 to 18 carbon atoms, and about .001% to 5% by weight based on said poly-α-olefin of an alkylated hydroquinone monoglycidyl ether having a formula selected from the group consisting of

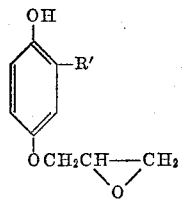

and

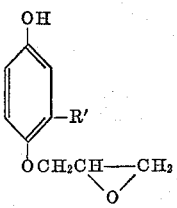

wherein R' is a tertiary alkyl radical having 4 to 8 carbon atoms.

3. A composition as defined by claim 2 wherein the diester of 3,3'-thiodipropionic acid is di-n-butyl-3,3'-thiodipropionate.

4. A composition as defined by claim 2 wherein the diester of 3,3'-thiodipropionic acid is dilauryl-3,3'-thiodipropionate.

5. A composition as defined by claim 2 wherein the diester of 3,3'-thiodipropionic acid is distearyl-3,3'-thiodipropionate.

6. A solid poly-α-olefin composition comprising solid polyethylene containing a stabilizer combination comprising about .001% to 5% by weight based on said polyethylene of a diester of 3,3'-thiodipropionic acid having the formula

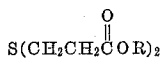

wherein R is an alkyl radical having 8 to 18 carbon atoms, and about .001% to 5% by weight based on said polyethylene of an alkylated hydroquinone monoglycidyl ether having a formula selected from the group consisting of

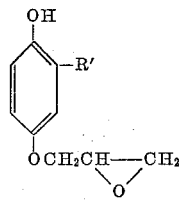

and

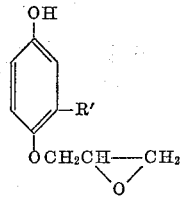

wherein R' is a tertiary alkyl radical having 4 to 8 carbon atoms.

7. A solid poly-α-olefin composition comprising solid polypropylene containing a stabilizer combination comprising about .001% to 5% by weight based on said polypropylene of a diester of 3,3'-thiodipropionic acid having the formula

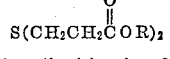

wherein R is an alkyl radical having 8 to 18 carbon atoms, and about .001% to 5% by weight based on said polypropylene of an alkylated hydroquinone monoglycidyl ether having a formula selected from the group consisting of

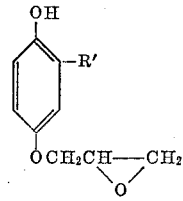

and

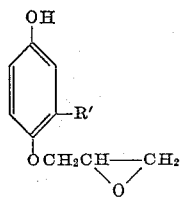

wherein R' is a tertiary alkyl radical having 4 to 8 carbon atoms.

8. A solid poly-α-olefin composition comprising solid polypropylene containing a stabilizer combination comprising about .01% to 3% by weight based on said polypropylene of dilauryl-3,3'-thiodipropionate and about .01% to 1% by weight based on said polypropylene of 2-tert-butyl-4-(2,3-epoxypropoxy) phenol.

9. A solid poly-α-olefin composition comprising solid polypropylene containing a stabilizer combination comprising about .01% to 3% by weight based on said polypropylene of dilauryl-3,3'-thiodipropionate and about .01% to 1% by weight based on said polypropylene of a 2-tert-octyl-4-(2,3-epoxypropoxy) phenol.

10. A solid poly-α-olefin composition comprising solid polypropylene containing a stabilizer combination comprising about .01% to 3% by weight based on said polypropylene of di-n-butyl-3,3'-thiodipropionate and about .01% to 1% by weight based on said polypropylene of 2-tert-butyl-4-(2,3-epoxypropoxy) phenol.

11. A solid poly-α-olefin composition comprising solid polypropylene containing a stabilizer combination comprising about .01% to 3% by weight based on said polypropylene of distearyl-3,3'-thiodipropionate and about .01% to 1% by weight based on said polypropylene of 2-tert-butyl-4-(2,3-epoxypropoxy) phenol.

References Cited in the file of this patent
UNITED STATES PATENTS 2,519,755   Gribbins _____ Aug. 22, 1950
2,758,119   Bell _____ Aug. 7, 1956